(12) United States Patent
Hsu (10) Patent No.: US 11,598,370 B2
(45) Date of Patent: Mar. 7, 2023

(54) LINEAR GUIDE RAIL STRUCTURE

(71) Applicant: CHIEFTEK PRECISION CO., LTD., Tainan (TW)

(72) Inventor: Ming-Che Hsu, Tainan (TW)

(73) Assignee: Chieftek Precision Co., Ltd., Tainan (TW)

( * ) Notice: Subject to any disclaimer, the term of this patent is extended or adjusted under 35 U.S.C. 154(b) by 99 days.

(21) Appl. No.: 17/179,959

(22) Filed: Feb. 19, 2021

(65) Prior Publication Data
US 2021/0262520 A1 Aug. 26, 2021

(30) Foreign Application Priority Data

Feb. 25, 2020 (TW) .................................. 109106109

(51) Int. Cl.
*F16C 29/08* (2006.01)

(52) U.S. Cl.
CPC .................................. *F16C 29/082* (2013.01)

(58) Field of Classification Search
CPC ....... F16C 29/005; F16C 29/08; F16C 29/082
See application file for complete search history.

(56) References Cited

U.S. PATENT DOCUMENTS

| | | | |
|---|---|---|---|
| 5,315,894 A | 5/1994 | Tsukada | |
| 5,575,566 A | 11/1996 | Faulhaber | |
| 5,622,433 A | 4/1997 | Suzuki et al. | |
| 6,513,976 B2 * | 2/2003 | Maiss | F16C 29/005 384/15 |
| 6,592,261 B2 | 7/2003 | Mochizuki | |
| 6,749,338 B2 | 6/2004 | Schmidt | |
| RE42,885 E | 11/2011 | Yamaguchi et al. | |
| 9,581,204 B2 * | 2/2017 | Yoshida | F16C 29/06 |
| 2002/0067867 A1 | 6/2002 | Maiss | |
| 2008/0304773 A1 * | 12/2008 | Chen | F16C 29/082 384/15 |
| 2009/0257692 A1 | 10/2009 | Sattler | |

FOREIGN PATENT DOCUMENTS

| | | |
|---|---|---|
| DE | 19919247 A1 | 11/2000 |
| DE | 10032473 A1 | 1/2002 |
| JP | 2002161917 A | 6/2002 |
| JP | 3544402 * | 7/2004 |

(Continued)

*Primary Examiner* — James Pilkington
(74) *Attorney, Agent, or Firm* — Rosenberg, Klein & Lee (57) ABSTRACT

A linear guide rail structure includes a guide rail, a dustproof cover, a pressure-exerting plate, and a locking member. The guide rail extends along an axial direction. The guide rail has at least one locking hole extending from a top surface in a height direction perpendicular to the axial direction. The dustproof cover is disposed on the top surface of the guide rail to cover the locking hole. The pressure-exerting plate is disposed on an end portion of the guide rail to press against the dustproof cover. The locking member includes a fastener and at least one pressure-exerting block. The fastener is fixed to the end portion of the guide rail. The pressure-exerting block is locked into the fastener in the height direction to abut against the pressure-exerting plate in the height direction, so that the pressure-exerting plate is pressed against the dustproof cover.

10 Claims, 11 Drawing Sheets

(56) References Cited

FOREIGN PATENT DOCUMENTS

| | | |
|---|---|---|
| JP | 2006009869 A | 1/2006 |
| TW | 201139880 A | 11/2011 |
| TW | M477515 U | 5/2014 |
| TW | M505556 U | 7/2015 |
| WO | 0133090 A1 | 5/2001 |
| WO | WO2011021565 * | 8/2010 |

* cited by examiner

LINEAR GUIDE RAIL STRUCTURE

FIELD OF THE INVENTION

The present invention relates to a linear guide rail structure, and more particularly to a guide rail having a pressure-exerting plate and a locking member at its end portion for directly applying a force in a height direction to fix a dustproof cover.

BACKGROUND OF THE INVENTION

A linear guide rail is generally formed with a plurality of bolt holes arranged along the axial direction of the guide rail. When in use, the guide rail is fixed on a working platform with bolts. In actual use, dust or oil stains often accumulate in the bolt holes, so that when the rigid body of the slider passes through the position of the bolt hole, the dust and dirt enter the rigid body of the slider to hinder the rolling of the rollers in the rigid body of the slider, causing the rigid body of the slider not to run smoothly. Therefore, in order to avoid this phenomenon, bolt hole caps or dustproof covers are provided to cover the bolt holes so as to reduce accumulation of dust, dirt or oil on the bolt holes.

For assembly, in addition to inserting the bolt hole caps into the bolt holes in sequence, it is difficult to keep the surface of the guide rail smooth due to processing tolerances and there is still a phenomenon of accumulation of dust and dirt because the bolt hole caps are inserted into the bolt holes. Besides, the force from the rigid body of the slider when running on the bolt hole caps will cause the bolt hole cap to sink, leading to accumulation of dust and dirt in the gap.

The dustproof cover is in the form of a strip. The use of the dustproof cover to cover the surface of the guide rail can solve the deficiency caused by the use of the bolt hole cap.

As disclosed in U.S. patent application early publication No. 20090257692, titled "guide rail with a cover strip for a linear bearing"; U.S. Pat. No. 6,749,338, titled "arrangement of a cover band on a linear guide"; German Patent No. 19919247, titled "guide rail for linear bearing, with two insertion grooves running longitudinally to connect to longitudinal groove; and PCT Patent No. 0133090, titled "guide rail for a linear bearing", a long groove is provided on the surface of a guide rail, and a dustproof cover has an elastically deformable engaging portion. The dustproof cover covers the long groove on the surface of the guide rail, and the elastically deformable engaging portion is engaged with the inner surface of the long groove by elastic deformation, and the surface of the dustproof cover is flush with the upper surface of the guide rail.

As disclosed in Taiwan Patent No. 201139880, titled "motion guide device and cover for motion guide device"; U.S. Pat. No. 5,622,433 titled "top cover along with a track rail unit and guide unit on which it is equipped"; German Patent No. 10032473 titled "guide rail for linear bearing has cover belt composed of two angle-edged sheet strips"; and German Patent No. 29522090 titled "anordnungzumVerschliessen von Bohrungen in einethihrungsschiene", a guide rail is formed with a counterbore, and an insert is provided under a dustproof cover. The insert of the dustproof cover is elastically deformed and embedded in the counterbore of the guide rail to fix the dustproof cover on the guide rail.

In the foregoing two methods, the engaging portion or the inert of the dustproof cover has been deformed and engaged with the inner surface of the long groove or in the counterbore, so it is not easy to dismantle for maintenance and replacement. In addition, the dustproof cover is only supported and held by the elastic force, so the coupling rigidity in the height direction perpendicular to the guide rail is poor, and the dustproof cover may be unstable.

As disclosed in U.S. Pat. No. 5,575,566 titled "linear motion guide cover band"; U.S. Pat. No. RE42885 titled "linear guide device"; and U.S. Pat. No. 6,592,261 titled "motion guide device", both sides of a dustproof cover are provided with elastic clamping members. The elastic clamping members are configured to clamp both sides of a guide rail to fix the dustproof cover on the guide rail. This way uses an elastic support for clamping, which strengthens the coupling force perpendicular to the guide rail. However, there is no force in the axial direction for fixing the dustproof cover. It is difficult to effectively avoid the axial movement of the dustproof cover when the slider slides.

In order to prevent a dustproof cover from sliding or loosening, as disclosed in U.S. Pat. No. 5,315,894 titled "stopper device for linear guide device" and Japanese Patent No. JP2006009869 titled "linear guide unit", the opposing ends of the guide rail are provided with fixing mechanisms to fix the dustproof cover. The fixing mechanisms are configured to lock the side bent portions of the dustproof cover. The dustproof cover is very thin, having a thickness of 0.1 mm to 0.3 mm. The fixing mechanism locks the side bent portions of the dustproof cover, which is prone to stress concentration and damage to the dustproof cover. The lateral component from the fixing mechanisms to lock the side bent portions of the dustproof cover may cause the dustproof cover to loosen and slip.

In order to overcome the problem that the dustproof cover is thin to result in stress concentration and damage to the dustproof cover, as disclosed in U.S. Pat. No. 6,513,976 titled "linear guide arrangement", a press member is provided on the dustproof cover, as shown in FIG. 17. The fixing mechanism is locked on the press member. The press member is configured to press the dustproof cover. In this patent, the fixing mechanism is to apply force in the horizontal direction and use friction to fix both ends of the dustproof cover. Since the friction force is about 0.3 to 0.5 of the positive force, the force in the horizontal direction must be 2 to 3 times the fixing force. Therefore, it is necessary to provide a stronger structure to lock the press member when applying a force.

In order to improve the simplicity of the structure, as disclosed in U.S. Pat. No. 6,513,976 titled "linear guide arrangement" and Taiwan Utility Model Publication No. M477515U titled "slide rail with cover strip fixing device", the fixed direction and the force direction are set in different axial directions by using the elastic principle of the fixing member. Since the elastic force and the amount of deformation depend on the rigidity of the fixing member, when the rigidity increases, the amount of deformation becomes smaller under the same elastic force. Therefore, in the design of the fixing member, it is required for more precise sizes of processing. When the rigidity is too small, the fixing force will also become smaller, resulting in insufficient fixing force.

SUMMARY OF THE INVENTION

The primary object of the present invention is to provide a linear guide rail structure, comprising a guide rail, a dustproof cover, a pressure-exerting plate and a locking member. The guide rail extends along an axial direction. Two opposing ends of the guide rail in the axial direction each have an end portion. The guide rail has a top surface.

The guide rail has at least one locking hole extending from the top surface in a height direction perpendicular to the axial direction. The dustproof cover extends along the axial direction. The dustproof cover has a flat section covering the locking hole. The pressure-exerting plate is disposed on the end portion of the guide rail. The pressure-exerting plate has a flat press surface to press against the flat section. The locking member includes a fastener and at least one pressure-exerting block. The fastener is fixed on the end portion of the guide rail. An accommodation space is defined between the fastener and the dustproof cover. The pressure-exerting plate is located in the accommodation space. The accommodation space has an accommodation width in a width direction. The width direction is perpendicular to the axial direction and the height direction. The pressure-exerting plate has a pressure-exerting plate width in the width direction. The pressure-exerting plate width is smaller than the accommodation width so that the pressure-exerting plate is not in contact with the fastener. The pressure-exerting block is locked into the fastener in the height direction to abut against the pressure-exerting plate in the height direction so that the press surface of the pressure-exerting plate is pressed against the flat section.

Preferably, the pressure-exerting plate fully covers the flat section in the width direction.

Preferably, the at least one pressure-exerting block includes one pressure-exerting block. After the pressure-exerting block is locked into the fastener, it abuts against a central portion of the pressure-exerting plate in the width direction.

Preferably, the at least one pressure-exerting block includes two or more than two pressure-exerting blocks. After the pressure-exerting blocks are locked into the fastener, they abut against the pressure-exerting plate along the width direction. Preferably, the two pressure-exerting blocks closest to two side edges of the pressure-exerting plate in the width direction are pressed against the pressure-exerting plate, accounting for 10% to 20% of the width of the pressure-exerting plate near the side edges.

Preferably, the pressure-exerting plate has at least one press foot extending in the height direction to press against the flat section in the width direction.

Preferably, the pressure-exerting plate exceeds the dustproof cover in the width direction.

Preferably, the dustproof cover has a thickness between 0.1 mm and 0.3 mm, and the pressure-exerting plate has a thickness between 1 mm and 3 mm.

Preferably, the locking member has at least one pressure-exerting block in the axial direction to be locked into the fastener to abut against the pressure-exerting plate in the height direction.

Preferably, the fastener has a flat portion and an inwardly bent portion that is bent and retracted inwardly from either side of the flat portion. The inwardly bent portion is fastened to a recess below the top surface.

According to the above technical features, the following effects can be achieved:

The invention provides a direct vertical force to press and fix the dustproof cover in the height direction, instead of fixing the dustproof cover by means of components, having a better fixing effect. That is, the end portion of the guide rail has the pressure-exerting plate and the pressure-exerting block of the locking member to fix the dustproof cover in the height direction. The pressure-exerting block directly applies a force in the height direction to press against the pressure-exerting plate, providing a better fixing effect on the dustproof cover.

1. The pressure-exerting block directly exerts a vertical force, which will not produce any component other than the height direction of the dustproof cover. It can effectively avoid the slipping and loosening of the dustproof cover caused by other components. Besides, the fastener is firmly buckled on the guide rail, so that the fastener is only configured to provide the pressure-exerting block with a locking and fixing base. The pressure-exerting block is locked into the fastener and pressed against the pressure-exerting plate to exert a force to the pressure-exerting plate.

2. The pressure-exerting plate fully covers the dustproof cover in the width direction and even exceeds the dustproof cover. This is beneficial to fully press the dustproof cover to prevent it from loosening. The press surface of the pressure-exerting plate is flat. Compared with a cylindrical or other-shaped press member, the flat pressure-exerting plate can effectively and comprehensively press the dustproof cover without increasing the volume of the press member.

3. The pressure-exerting block of the locking member is locked in the central position of the fastener in the width direction to fix the pressure-exerting plate. Preferably, after the two pressure-exerting blocks are locked into the fastener, they abut against two opposing sides of the pressure-exerting plate in the width direction. For example, the two pressure-exerting blocks are pressed against the pressure-exerting plate, accounting for 10% to 20% of the width of the pressure-exerting plate near the side edges. This locks the two opposing sides of the pressure-exerting plate evenly to fix the dustproof cover better.

4. The locking member includes a fastener and at least one pressure-exerting block. The fastener has a flat portion and an inwardly bent portion that is bent and retracted inwardly from either side of the flat portion. The inwardly bent portion is fastened to a recess below the top surface to obtain a stable fixing effect.

5. The pressure-exerting plate has at least one press foot extending in the height direction to press against the flat section of the dustproof cover in the width direction for exerting a force to the dustproof cover so as to obtain a stable fixing effect.

6. The pressure-exerting plate is arranged in the accommodation space between the fastener and the dustproof cover. For linear guide rails, the volume is increased less, which is beneficial to be used in micro guide rails. The pressure-exerting plate width is smaller than the accommodation width of the accommodation space, so that the pressure-exerting plate is not in contact with the fastener. Therefore, when the fastener outside of the guide rail is collided and displaced by an external force, the pressure-exerting plate will not be affected by the collision and displacement of the fastener by the external force.

DETAILED DESCRIPTION OF THE PREFERRED EMBODIMENTS

Embodiments of the present invention will now be described, by way of example only, with reference to the accompanying drawings.

Figure 1:
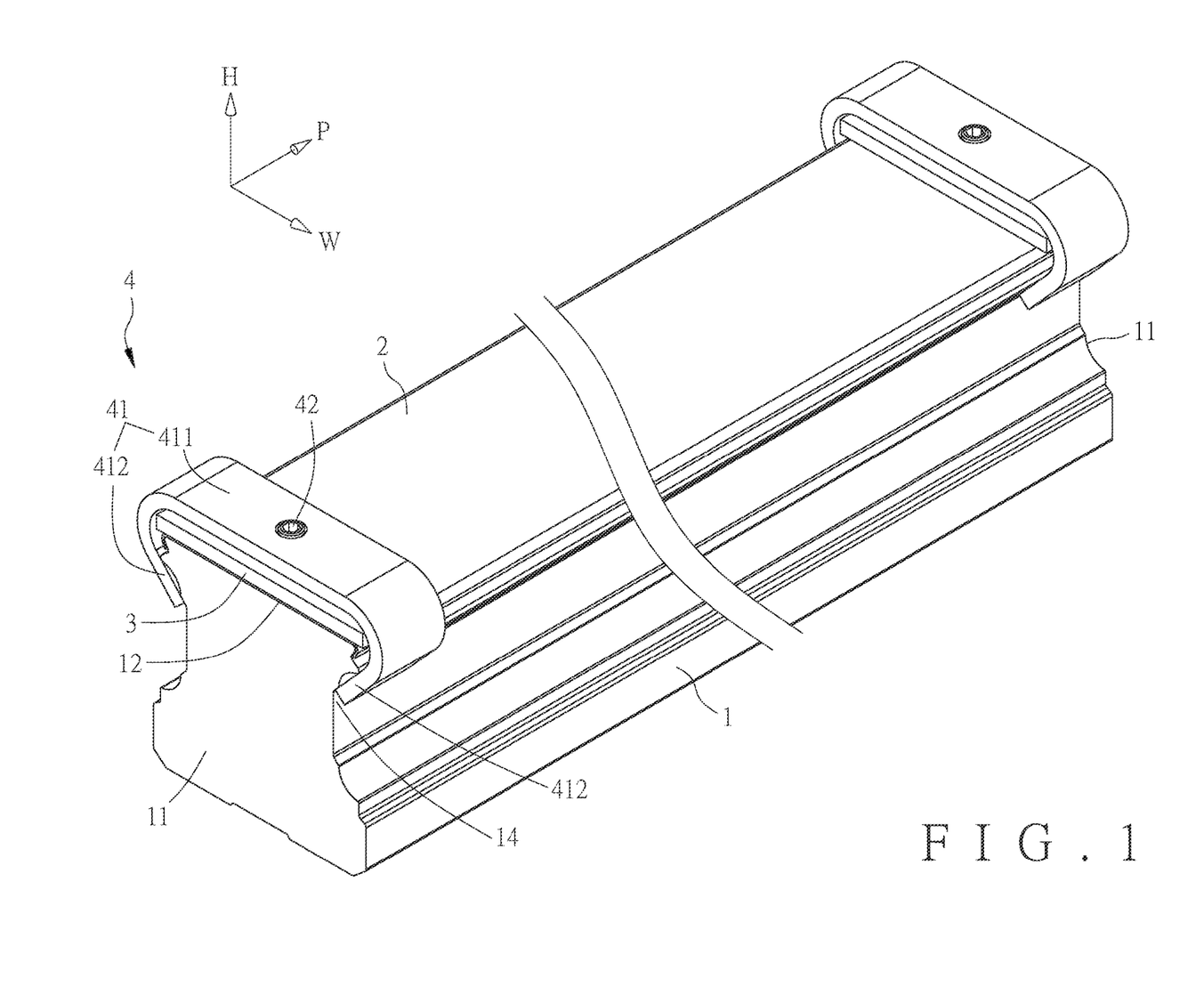
FIG. 1 is a perspective view in accordance with a first embodiment of the present invention.
Figure 2:
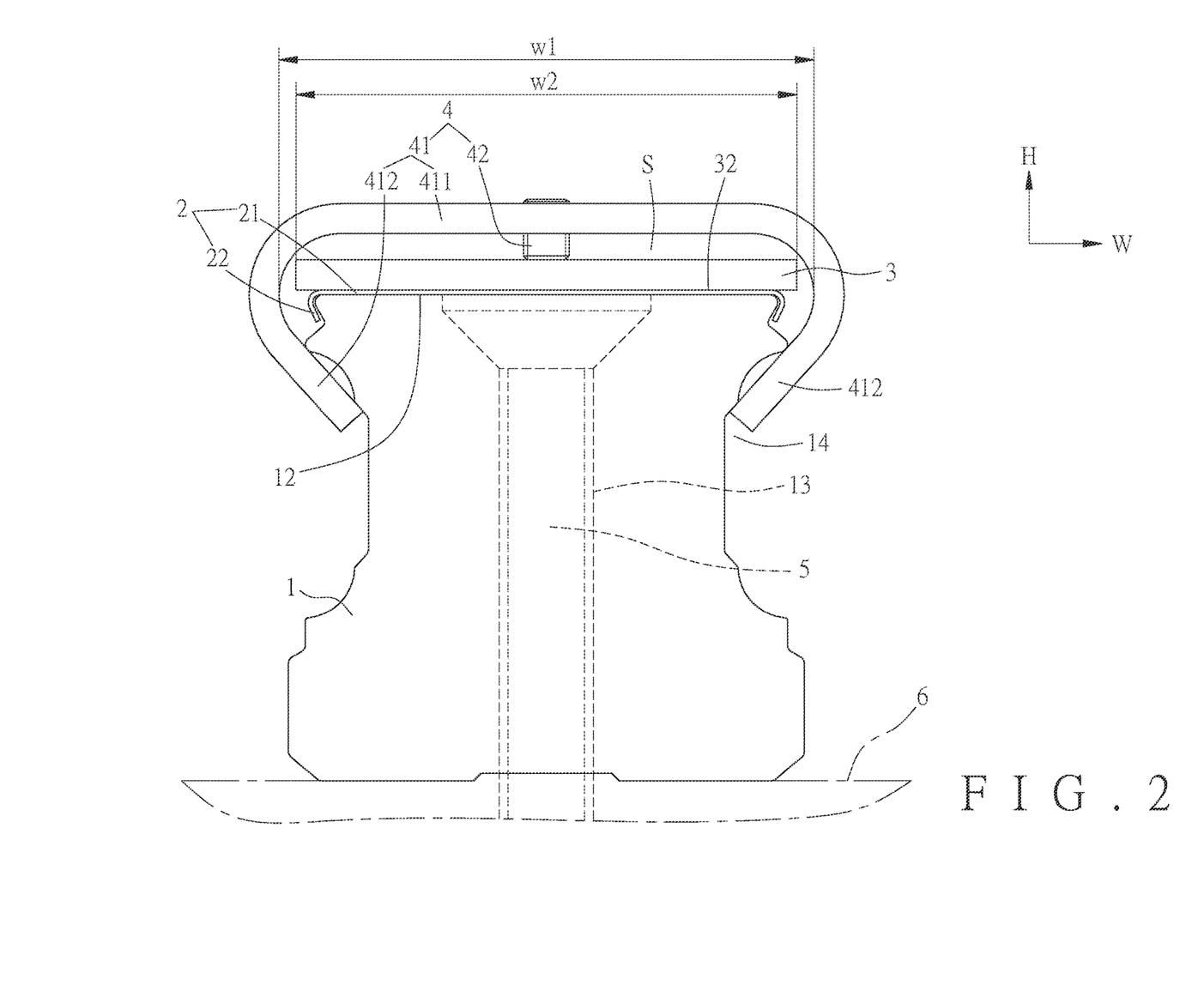
FIG. 2 is a front view in accordance with the first embodiment of the present invention.

As shown in FIG. 1 and FIG. 2, a first embodiment of the present invention comprises a guide rail (1) and a dustproof cover (2) on the guide rail (1). Each of two end portions (11) of the guide rail (1) has a pressure-exerting plate (3) and a locking member (4) for locking the dustproof cover (2).

The guide rail (1) extends along an axial direction (P). Two opposing ends of the guide rail (1) in the axial direction (P) are defined as the two end portions (11). The guide rail (1) has a top surface (12). The guide rail (1) has at least one locking hole (13) extending from the top surface (12) in a height direction (H) perpendicular to the axial direction (P). In this embodiment, the locking hole (13) is a screw hole. The dustproof cover (2) is in the form of a strip. The dustproof cover (2) extends along the axial direction (P). The dustproof cover (2) covers the top surface (12) of the guide rail (1). The pressure-exerting plate (3) is disposed on either end portion (11) of the guide rail (1) and is pressed against the dustproof cover (2). The locking member (4) includes a fastener (41) and at least one pressure-exerting block (42). This embodiment includes one pressure-exerting block (42). The fastener (41) is fixed on the guide rail (1). An accommodation space (S) is defined between the fastener (41) and the dustproof cover (2). The pressure-exerting plate (3) is located in the accommodation space (S). The fastener (41) can be fixed to the guide rail (1) in any manner. For example, in this embodiment, the fastener (41) is made of a material with high rigidity and is not easily deformed. The fastener (41) has a flat portion (411) and an inwardly bent portion (412) that is bent and retracted inwardly from either side of the flat portion (411). The inwardly bent portion (412) is fastened to a recess (14) below the top surface (12). The pressure-exerting block (42) is locked into the flat portion (411) of the fastener (41) in the height direction (H) and abuts against the pressure-exerting plate (3) in the height direction (H), so that the pressure-exerting plate (3) is pressed against the dustproof cover (2) to prevent the dustproof cover (2) from moving on the guide rail (1) axially.

Referring to FIG. 2, a bolt (5) is screwed into the locking hole (13) of the guide rail (1) and locked onto a fixed platform (6) for fixing the guide rail (1) to the fixed platform (6). The dustproof cover (2) has a flat section (21) and inwardly bent sections (22) on two opposing sides of the flat section (21). When the dustproof cover (2) covers the top surface (12) of the guide rail (1), the flat section (21) covers the locking hole (13), and the inwardly bent sections (22) are buckled on two opposing sides of the guide rail (1). The pressure-exerting plate (3) has a flat press surface (32) to press against the flat section (21) of the dustproof cover (2). The guide rail (1) has a width direction (W). The width direction (W) is perpendicular to the axial direction (P) and the height direction (H). The pressure-exerting plate (3) fully covers the dustproof cover (2) in the width direction (W). In this embodiment, the pressure-exerting plate (3) exceeds the dustproof cover (2) in the width direction (W), so that the pressure-exerting plate (3) facilitates the assembly and comprehensively presses the dustproof cover (2) to prevent the dustproof cover (2) from loosening. The accommodation space (S) has an accommodation width (W1) in the width direction (W). The pressure-exerting plate (3) has a pressure-exerting plate width (W2) in the width direction (W). The pressure-exerting plate width (W2) is smaller than the accommodation width (W1), so that the pressure-exerting plate (3) is not in contact with the fastener (41). After the pressure-exerting block (42) is locked into the fastener (41), it abuts against the central portion of the pressure-exerting plate (3) in the width direction (W). In this embodiment, the pressure-exerting plate (3) and the pressure-exerting block (42) of the locking member (4) are configured to fix the dustproof cover (2) in the height direction (H), which can avoid the problem that the dustproof cover (2) is directly locked by the fixing member to damage the dustproof cover (2) easily due to stress concentration. Besides, Applying force directly in the height direction (H) to fix the dustproof cover (2) can prevent components in other directions from acting on the dustproof cover (2) to cause the dustproof cover (2) to slip and loosen. Furthermore, in this embodiment, the thickness of the dustproof cover (2) is between 0.1 mm and 0.3 mm, and the thickness of the pressure-exerting plate (3) is between 1 mm and 3 mm, which can avoid increasing the volume of the overall linear guide rail. This is beneficial to use in miniature linear slides.

Figure 3:
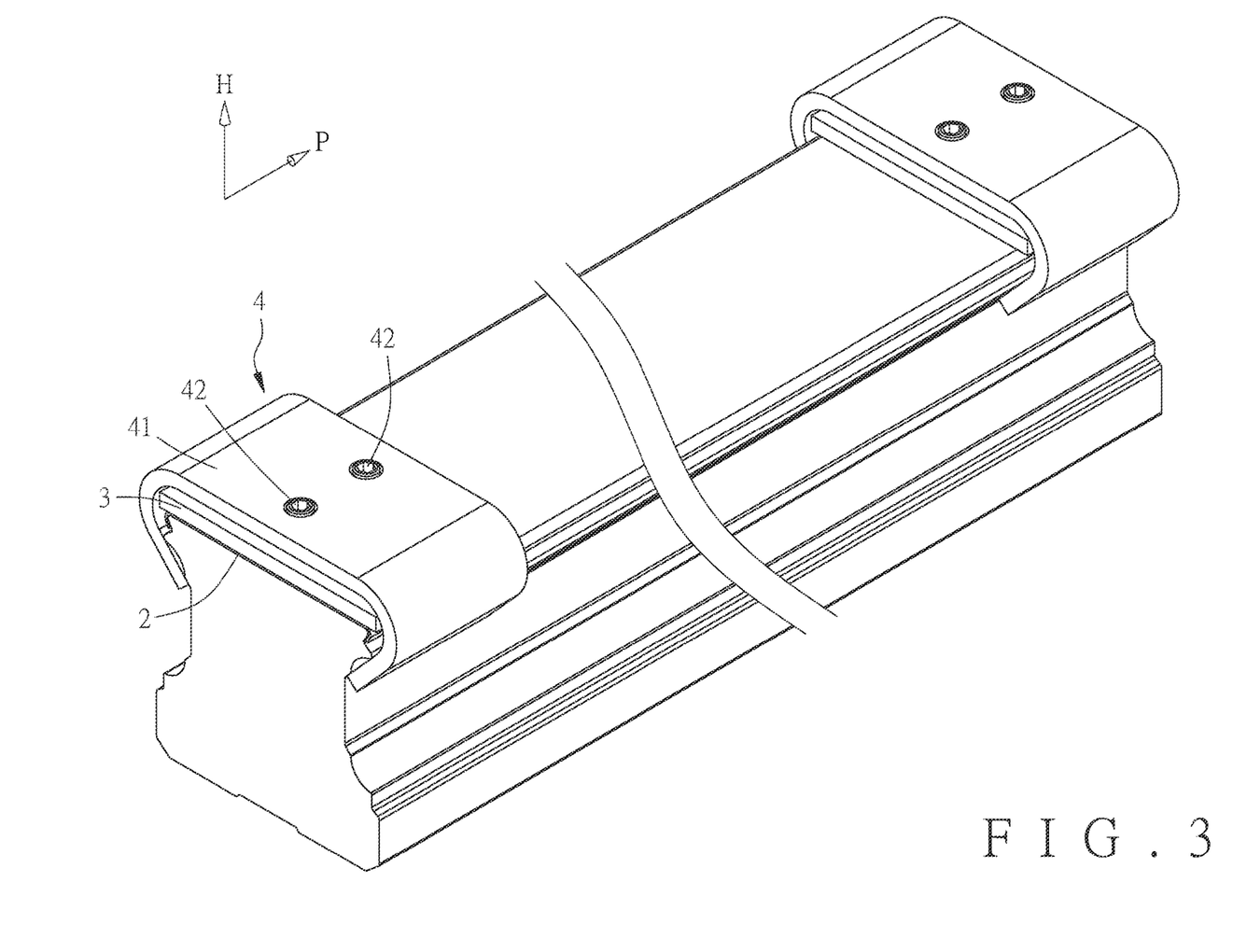
FIG. 3 is a perspective view in accordance with a second embodiment of the present invention.

FIG. 3 shows a second embodiment of the present invention. The second embodiment is substantially similar to the first embodiment with the exceptions described below. In this embodiment, the locking member (4) has two pressure-exerting blocks (42) in the axial direction (P) to be locked into the fastener (41) for pressing against the pressure-exerting plate (3) in the height direction (H). Thereby, the dustproof cover (2) is more firmly fixed.

Figure 4:
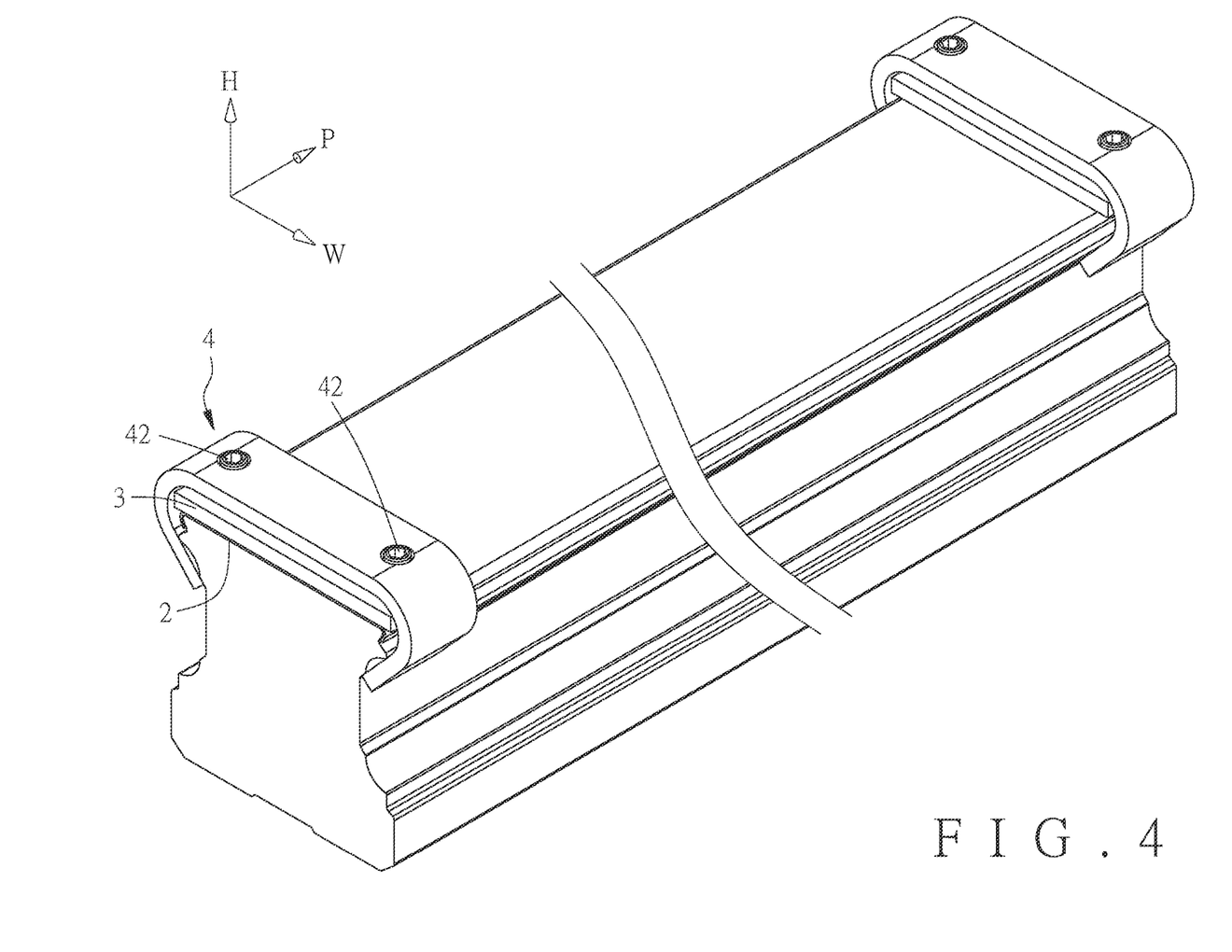
FIG. 4 is a perspective view in accordance with a third embodiment of the present invention.
Figure 5:
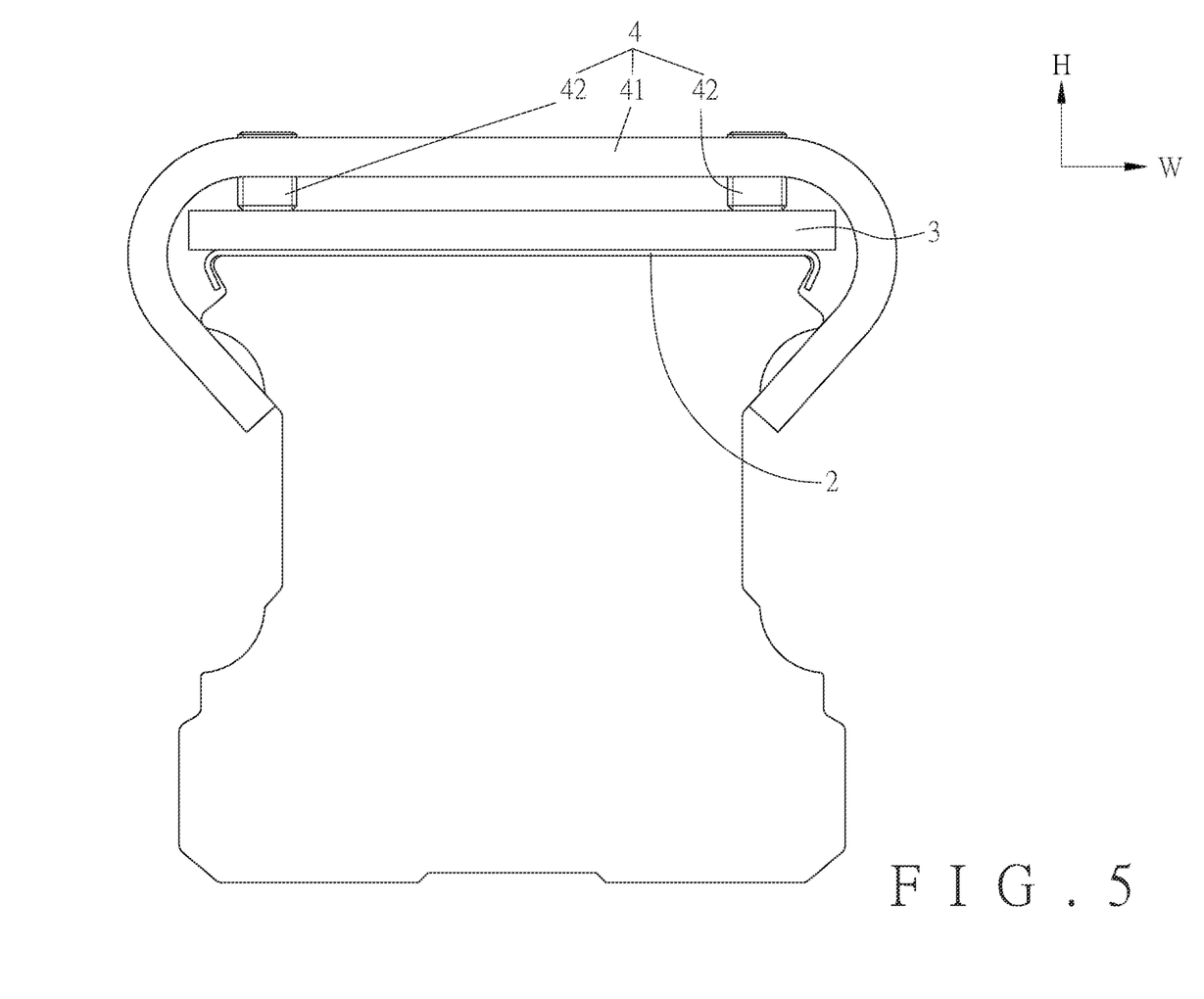
FIG. 5 is a front view in accordance with the third embodiment of the present invention.

FIG. 4 and FIG. 5 show a third embodiment of the present invention. The third embodiment is substantially similar to the first embodiment with the exceptions described below. In this embodiment, the locking member (4) has two pressure-exerting blocks (42). After the two pressure-exerting blocks (42) are locked into the fastener (41), they abut against two opposing sides of the pressure-exerting plate (3) in the width direction (W). In this embodiment, the pressure-exerting blocks (42) abut against the pressure-exerting plate (3) in the width direction (W), accounting for 10% to 20% of the width of the pressure-exerting plate (3) near the side edges, which is the position of the dustproof cover (2) with better rigidity. By means of evenly locking the two opposing sides of the pressure-exerting plate (3), the dustproof cover (2) can be fixed more firmly.

Figure 6:
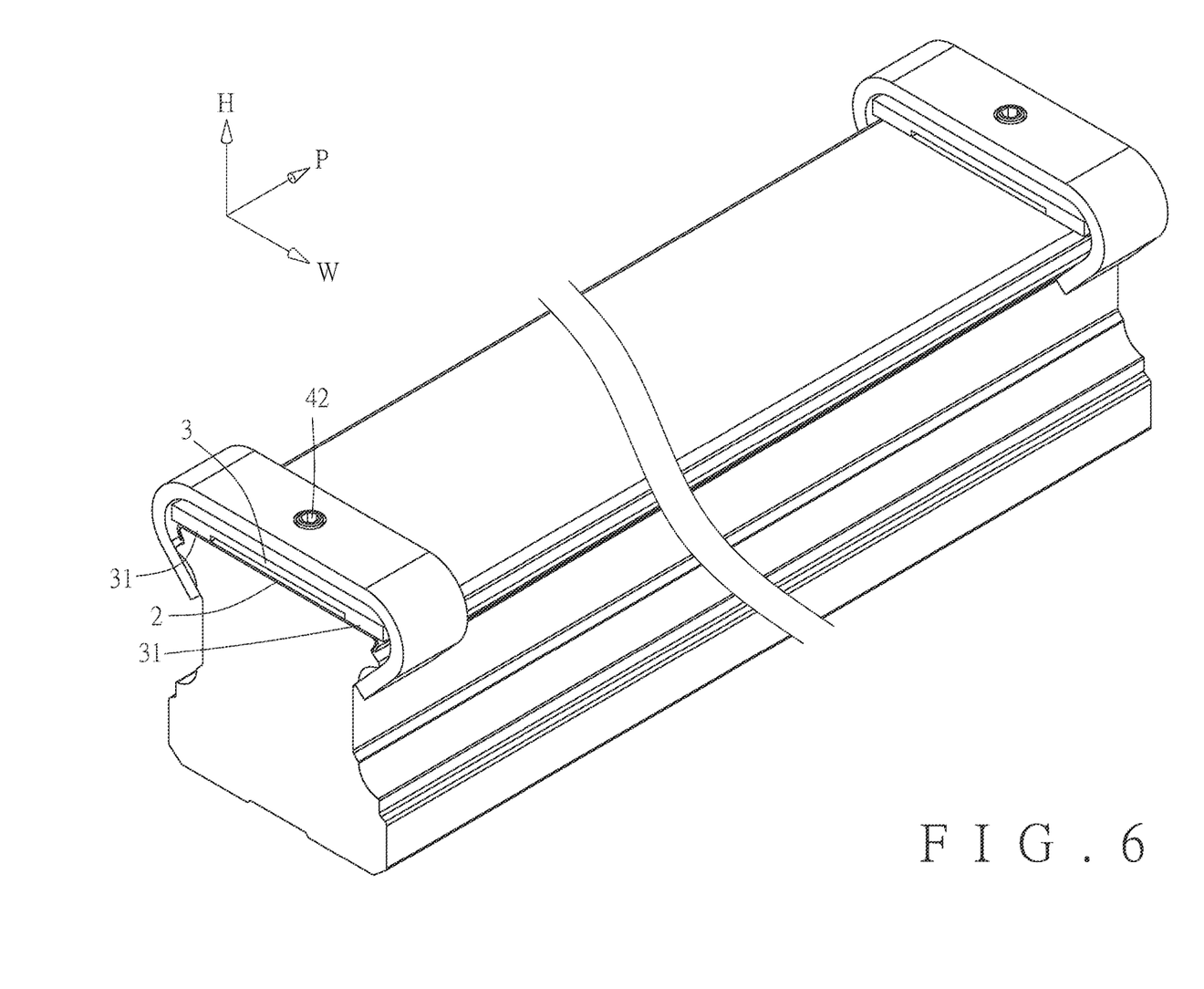
FIG. 6 is a perspective view in accordance with a fourth embodiment of the present invention.
Figure 7:
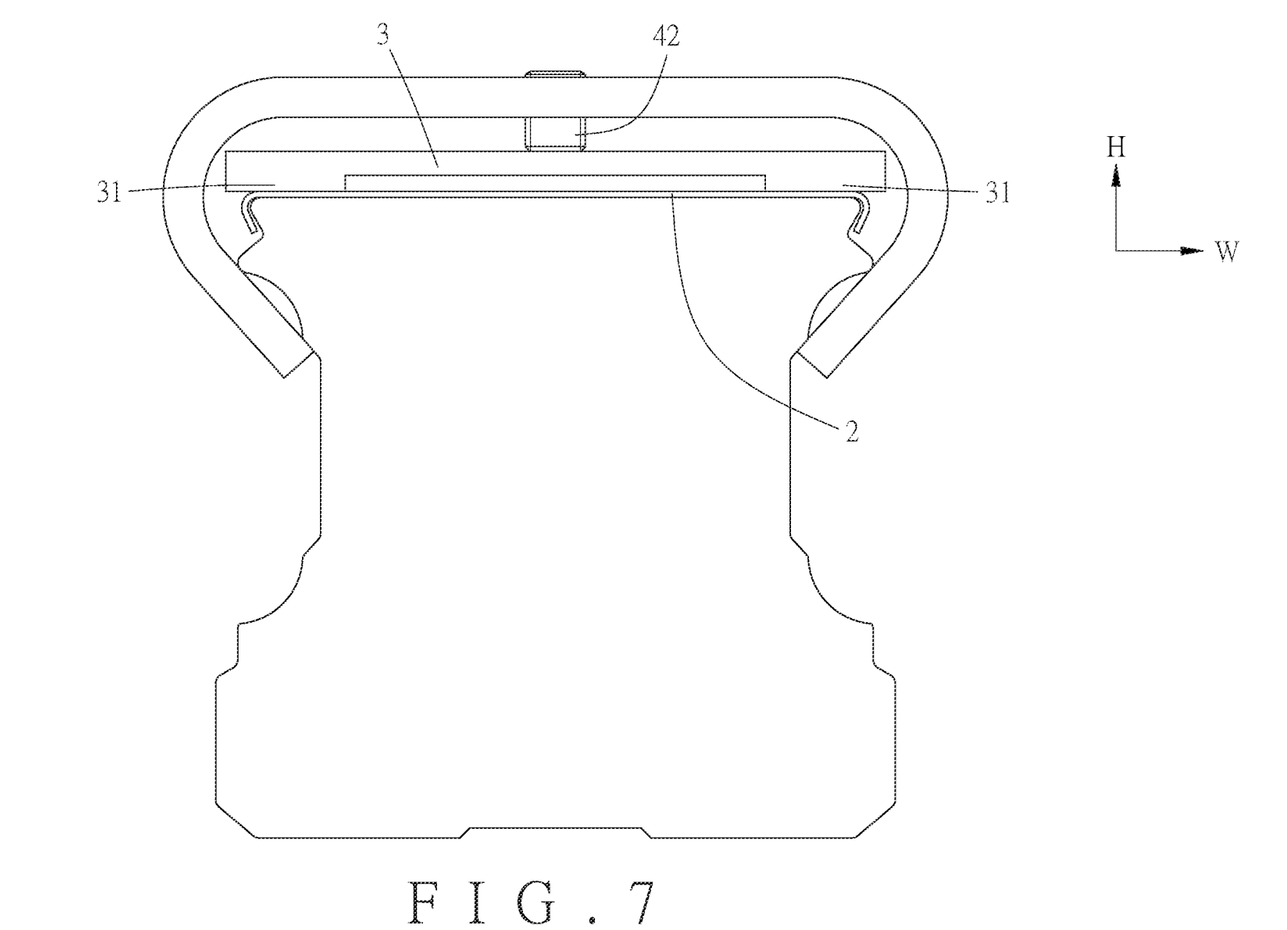
FIG. 7 is a front view in accordance with the fourth embodiment of the present invention.

FIG. 6 and FIG. 7 show a fourth embodiment of the present invention. The fourth embodiment is substantially similar to the first embodiment with the exceptions described below. In this embodiment, the pressure-exerting plate (3) has two press feet (31) extending in the height direction (H) to press against the two opposing sides of the flat section (21) of the dustproof cover (2) in the width direction (W), and a pressure-exerting block (42) is provided to abut against the central portion of the pressure-exerting plate (3) in the width direction (W). The press feet (31) have a small area relative to the integral pressure-exerting plate (3), which has a better press force on the dustproof cover (2) to fix the dustproof cover (2) firmly.

Figure 8:
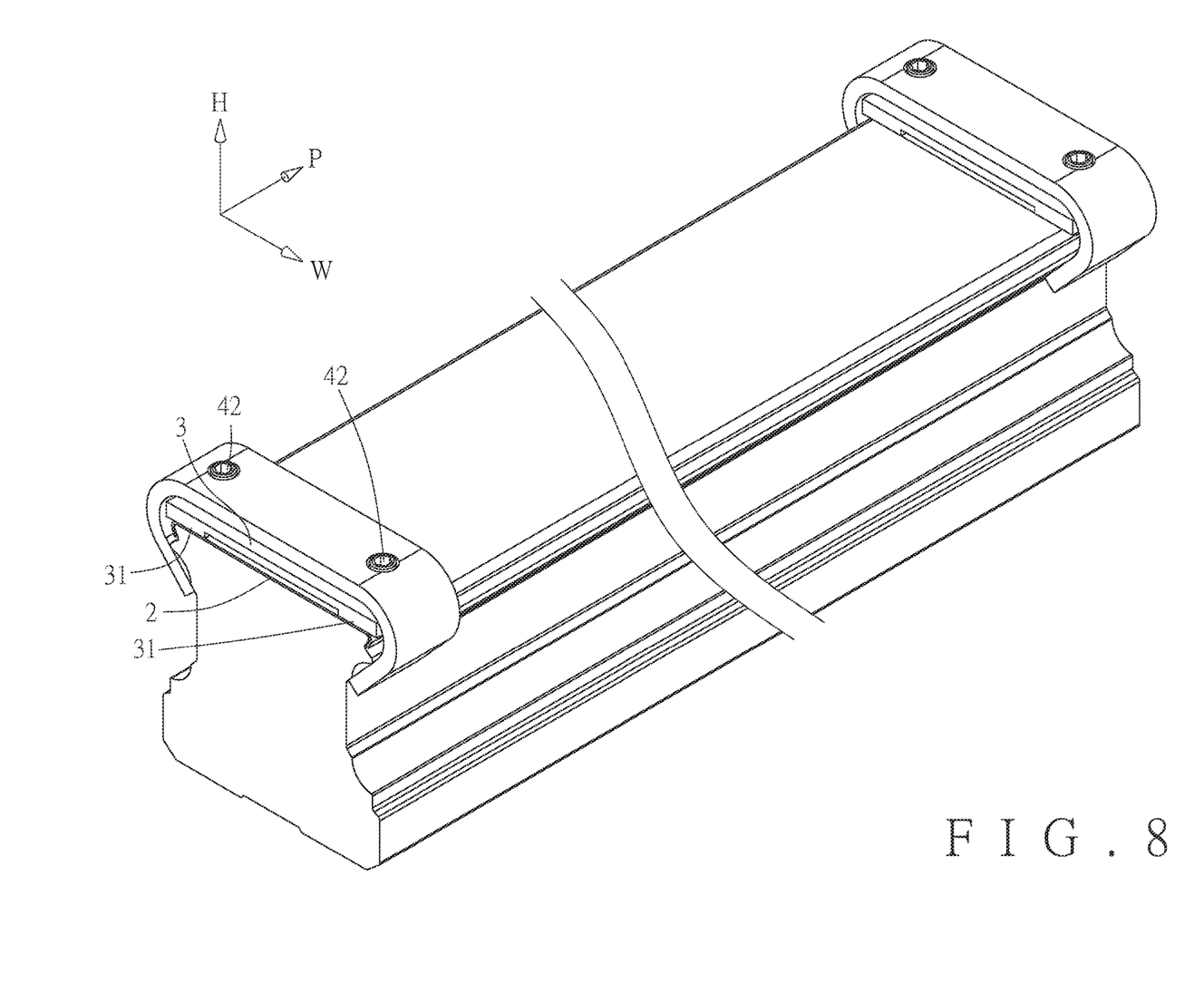
FIG. 8 is a perspective view in accordance with a fifth embodiment of the present invention.
Figure 9:
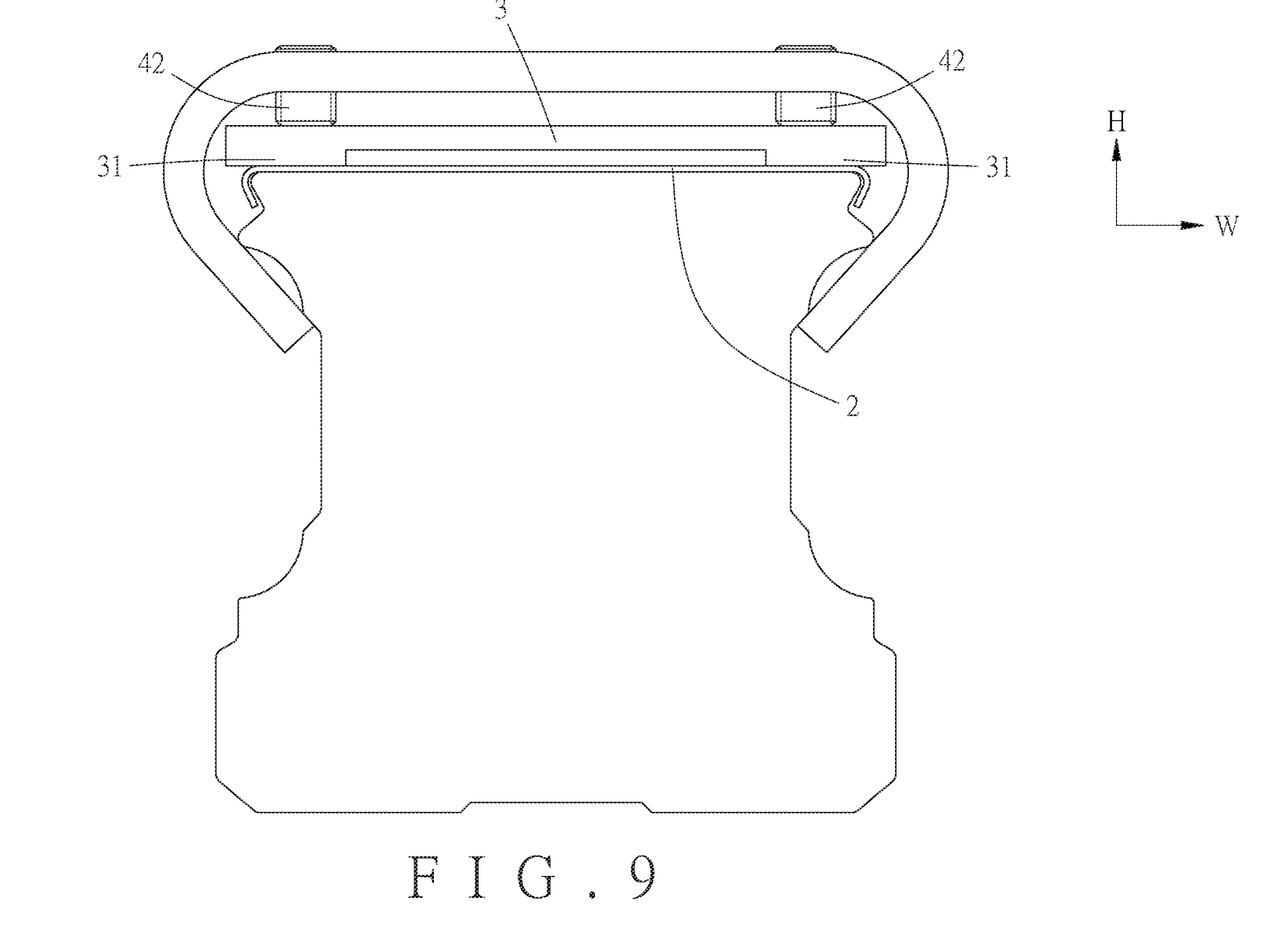
FIG. 9 is a front view in accordance with the fifth embodiment of the present invention.

FIG. 8 and FIG. 9 show a fifth embodiment of the present invention. The fifth embodiment is substantially similar to the first embodiment with the exceptions described below. In this embodiment, the pressure-exerting plate (3) has two press feet (31) extending in the height direction (H) to press against the two opposing sides of the flat section (21) of the dustproof cover (2) in the width direction (W), and two pressure-exerting blocks (42) are provided to abut against two opposing sides of the pressure-exerting plate (3) and correspond to the press feet (31). The press feet (31) have a small area relative to the integral pressure-exerting plate (3), which has a better press force on the dustproof cover (2) to fix the dustproof cover (2) firmly.

Figure 10:
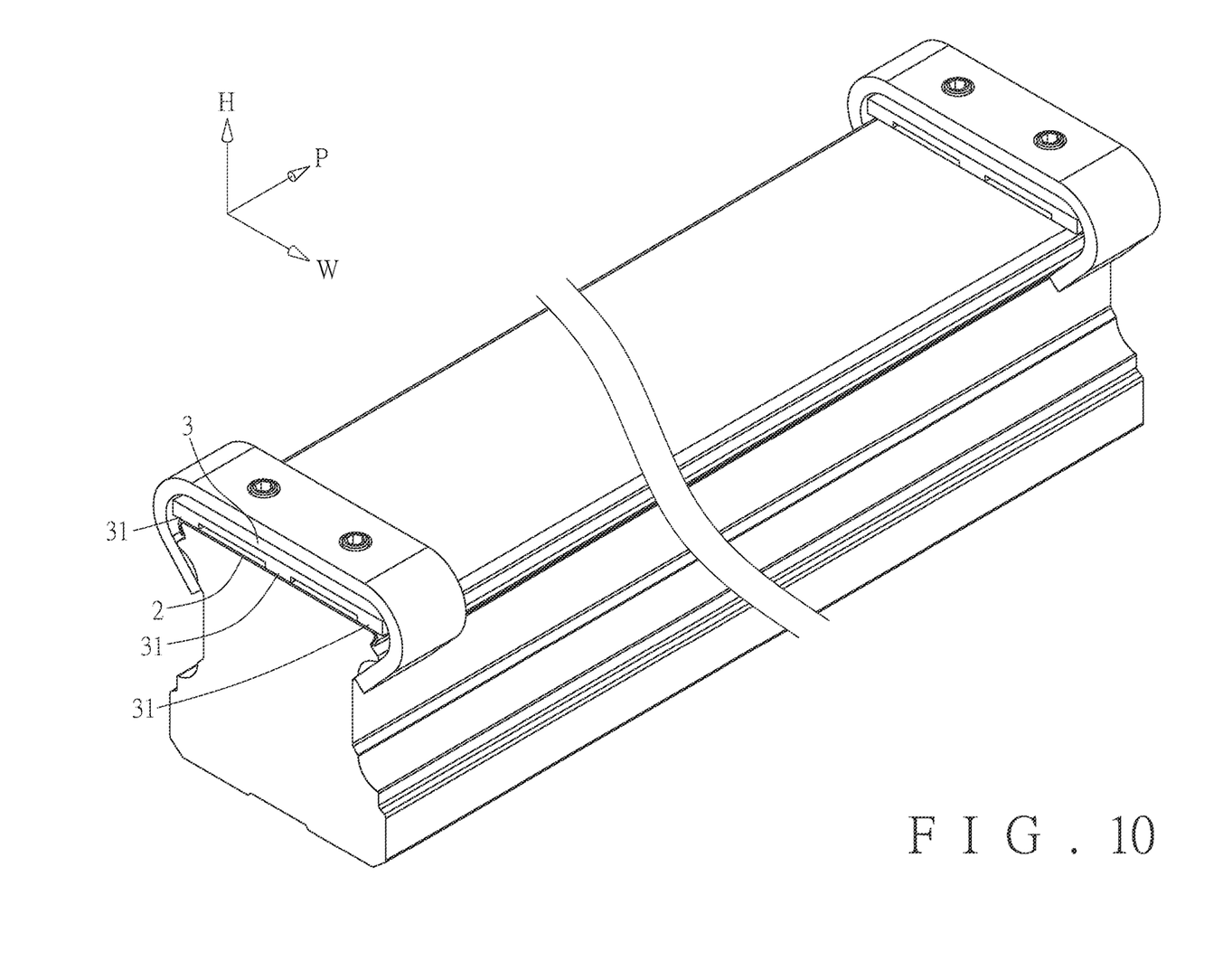
FIG. 10 is a perspective view in accordance with a sixth embodiment of the present invention.
Figure 11:
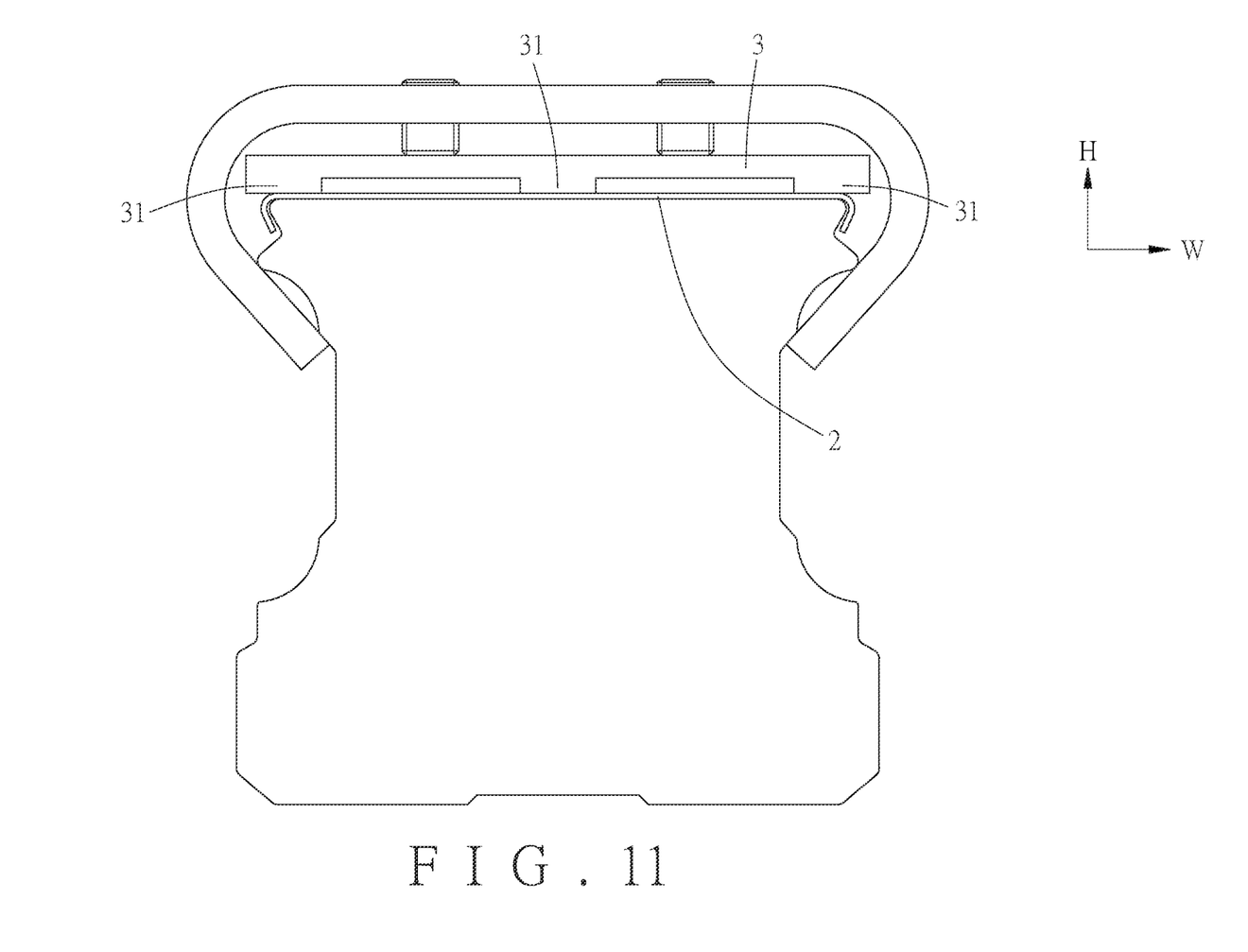
FIG. 11 is a front view in accordance with the sixth embodiment of the present invention.

FIG. 10 and FIG. 11 show a sixth embodiment of the present invention. The sixth embodiment is substantially similar to the first embodiment with the exceptions described below. In this embodiment, the pressure-exerting plate (3) has three press feet (31) extending in the height direction (H) to press against the central portion and the two opposing sides of the flat section (21) of the dustproof cover (2) in the width direction (W), so as to fix the dustproof cover (2) firmly.

It is further explained that because the dustproof cover (2) is very thin, in order to avoid the problem that a fixing member is used to lock the dustproof cover (2) to cause a damage to the dustproof cover (2) due to stress, the present invention uses the pressure-exerting plate (3) and the locking member (4) to directly apply a force in the height direction (H) to fix the dustproof cover (2).

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A linear guide rail structure, comprising:
    a guide rail, extending along an axial direction, two opposing ends of the guide rail in the axial direction each having an end portion, the guide rail having a top surface, the guide rail having at least one locking hole extending from the top surface in a height direction perpendicular to the axial direction;
    a dustproof cover, extending along the axial direction, the dustproof cover having a flat section covering the locking hole;
    a pressure-exerting plate, positioned at the end portion of the guide rail, the pressure-exerting plate having a flat press surface to press against the flat section;
    a locking member, including a fastener and at least one pressure-exerting block, the fastener being fixed on the guide rail, an accommodation space being defined between the fastener and the dustproof cover, the pressure-exerting plate being located in the accommodation space, the accommodation space having an accommodation width in a width direction, the width direction being perpendicular to the axial direction and the height direction, the pressure-exerting plate having a pressure-exerting plate width in the width direction, the pressure-exerting plate width being smaller than the accommodation width so that the pressure-exerting plate is not in contact with the fastener, the pressure-exerting block being locked into the fastener in the height direction and abuts against the pressure-exerting plate in the height direction so that the press surface of the pressure-exerting plate is pressed against the flat section.

2. The linear guide rail structure as claimed in claim 1, wherein the fastener is fixed at the end portion, and the pressure-exerting plate fully covers the flat section in the width direction.

3. The linear guide rail structure as claimed in claim 2, wherein the at least one pressure-exerting block includes one pressure-exerting block, after the pressure-exerting block is locked into the fastener, it abuts against a central portion of the pressure-exerting plate in the width direction.

4. The linear guide rail structure as claimed in claim 2, wherein the at least one pressure-exerting block includes two or more pressure-exerting blocks, after the pressure-exerting blocks are locked into the fastener, the pressure-exerting blocks are spaced apart along the width direction.

5. The linear guide rail structure as claimed in claim 4, wherein the pressure exerting plate has opposing side edges spaced one from another in the width direction, and the spaced apart pressure-exerting blocks are disposed adjacent the opposing side edges of the pressure-exerting plate and pressed against the pressure-exerting plate.

6. The linear guide rail structure as claimed in claim 2, wherein the pressure-exerting plate has at least one press foot extending in the height direction to press against the flat section.

7. The linear guide rail structure as claimed in claim 2, wherein the pressure-exerting plate width exceeds a width of the dustproof cover.

8. The linear guide rail structure as claimed in claim 1, wherein the dustproof cover has a thickness between 0.1 mm and 0.3 mm, and the pressure-exerting plate has a thickness between 1 mm and 3 mm.

9. The linear guide rail structure as claimed in claim 1, wherein the locking member has at least two pressure-exerting blocks disposed in spaced relationship in the axial direction to be locked into the fastener to abut against the pressure-exerting plate in the height direction.

10. The linear guide rail structure as claimed in claim 1, wherein the fastener has a flat portion and an inwardly bent portion that is bent and retracted inwardly in the width direction toward the guide rail from either side of the flat portion, and the inwardly bent portion is fastened to a recess provided in the guide rail.

* * * * *